(12) United States Patent
Chau et al.

(10) Patent No.: US 7,250,544 B2
(45) Date of Patent: *Jul. 31, 2007

(54) PROCESS FOR SELECTIVE HYDROGENATION USING A CATALYTIC REACTOR WITH A HYDROGEN-SELECTIVE MEMBRANE

(75) Inventors: Christophe Chau, Rueil Malmaison (FR); Denis Uzio, Marly le Roi (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 437 days.

This patent is subject to a terminal disclaimer.

(21) Appl. No.: 10/768,705

(22) Filed: Feb. 2, 2004

(65) Prior Publication Data
US 2004/0210097 A1 Oct. 21, 2004

(30) Foreign Application Priority Data
Jan. 31, 2003 (FR) .................................. 03 01093

(51) Int. Cl.
*C07C 2/02* (2006.01)
(52) U.S. Cl. .................. 585/520; 585/259; 585/260; 208/92
(58) Field of Classification Search .............. 208/92; 585/259, 260, 520
See application file for complete search history.

(56) References Cited

U.S. PATENT DOCUMENTS

| | | | |
|---|---|---|---|
| 4,179,470 A | 12/1979 | Mischenko et al. | |
| 4,827,071 A | 5/1989 | Hazbun | |
| 5,583,240 A | 12/1996 | Asher et al. | |
| 5,679,241 A * | 10/1997 | Stanley et al. | ................. 208/92 |
| 5,931,987 A | 8/1999 | Buxbaum | |
| 6,169,218 B1 * | 1/2001 | Hearn et al. | ................. 585/260 |
| 2001/0031902 A1 * | 10/2001 | Chau et al. | ................. 585/259 |

FOREIGN PATENT DOCUMENTS

| | | |
|---|---|---|
| DE | 199 18 486 | 10/2000 |
| FR | 2 277 059 | 1/1976 |
| GB | 2 187 759 | 9/1987 |
| WO | 02 092203 | 11/2002 |

* cited by examiner

*Primary Examiner*—Glenn A. Caldarola
*Assistant Examiner*—Prem C. Singh
(74) *Attorney, Agent, or Firm*—Millen, White, Zelano & Branigan, P.C.

(57) ABSTRACT

A process for selective hydrogenation of polyunsaturated compounds that are contained in a hydrocarbon feedstock in the presence of a catalytic reactor with a hydrogen-selective membrane comprises a) the introduction of said feedstock co-mixed with a first amount hydrogen into a reaction zone of said reactor, b) the contact of a second amount hydrogen with the upstream face of the membrane, which is inorganic and porous, then c) the catalytic reaction of the feedstock with hydrogen that has selectively traversed the membrane.

19 Claims, No Drawings

PROCESS FOR SELECTIVE HYDROGENATION USING A CATALYTIC REACTOR WITH A HYDROGEN-SELECTIVE MEMBRANE

CROSS REFERENCE TO RELATED APPLICATION

This application relates to Applicants' concurrently filed application entitled, "PROCESS FOR TOTAL HYDROGENATION USING A CATALYTIC REACTOR WITH A HYDROGEN-SELECTIVE MEMBRANE", now allowed application Ser. No. 10/768,176.

This invention relates to the field of selective hydrogenation of polyunsaturated molecules. More specifically, it has as its object a process for selective hydrogenation of polyunsaturated molecules that use a catalytic reactor with a hydrogen-selective membrane, obtained by combination of a porous inorganic membrane and a hydrogenation catalyst. The porous inorganic membrane is hydrogen-selective, and the catalyst makes possible the conversion by hydrogenation of unsaturated hydrocarbon molecules. The combination of an inorganic porous membrane, permeable and hydrogen-selective, and a hydrogenation catalyst makes it possible to monitor, within the catalytic hydrogenation bed, the concentration of hydrogen, which is reflected by very high catalytic selectivities for high hydrocarbon conversion rates.

The reactions for selective hydrogenation of polyunsaturated molecules exhibit a strong advantage in particular in the fields of refining and petrochemistry, fine chemistry and the farm-produce industry. In particular, the specifications in the field of refining and petrochemistry impose very low residual contents of polyunsaturated compounds (10 ppm or less), with a minimal loss of desired product, namely in general the monoolefins whose demand is constantly increasing. The selective hydrogenation reactions are exothermic, and the monitoring of the selectivity for the desired reaction products is a key component of the industrial process and the associated technology. In particular, it is difficult on the industrial scale to hydrogenate selectively a double bond on diene-type molecules, for example, or more generally on polyene-type hydrocarbons or aromatic molecules that comprise unsaturated hydrocarbon chains. It is also difficult on the industrial scale to hydrogenate selectively a triple bond on acetylene molecules. In the presence of hydrogen, successive hydrogenation reactions can intervene, and the exothermy of the reaction as well as the local overconcentrations of hydrogen make it difficult to obtain a single type of monohydrogenation product. It is then often necessary to operate with a low conversion of hydrocarbons, to dilute the feedstock and to impose a short dwell time of the hydrocarbons in the catalytic bed. The operations are complex and involve recirculation loops of the reaction effluents to increase the conversion without degrading the selectivity by successive passages of unconverted hydrocarbons upon contact of the catalyst. The existing selective hydrogenation processes generally use a catalytic reactor in which the hydrogen that is necessary to the reaction and the hydrocarbon feedstock that is to be hydrogenated are introduced either simultaneously or separately. The simultaneous introduction is made most often without monitoring the concentration of hydrogen at the inlet of the reactor and without preliminary separation of hydrogen, which implies that excess hydrogen circulates in the catalytic hydrogenation reactor (local overconcentrations of hydrogen), leading to risks of losing control of the reaction and making more complex the monitoring of the reaction and in particular the monitoring of the selectivity of the products of the reaction. The introduction of hydrogen and the hydrocarbon feedstock that is to be hydrogenated in two separate flows, at the inlet of the reactor, offers the advantage of being able to use a hydrogen source that is contained, for example, in an effluent of a refinery unit and that has been separated upstream from the catalytic hydrogenation reactor so as to monitor the concentration of hydrogen at the inlet of the reactor. However, the complete separation upstream generally requires cryogenic-type units, very detrimental in terms of investment. Patent Application EP-A1-1 132 453 describes the separation of hydrogen upstream from a selective hydrogenation catalytic reactor by means of an organic membrane such as, in particular, polyimide or polyaramide. Excess hydrogen that is present in an effluent of a refining unit is thus recovered, and it is possible to adjust the ratio of hydrogen to hydrocarbons at the inlet of the selective hydrogenation reactor. However, the monitoring of the ratio of hydrogen to hydrocarbons only at the inlet of the reactor does not make it possible to obtain satisfactory performance levels in terms of selectivity of hydrogenation products. Actually, the selectivity of hydrogenation products can be greatly degraded when the conversion rates of hydrocarbons increase. Also reported recently in academic literature (Lambert et al., Catalysis Letters 57 (1999)—17, Lange et al., Journal of Catalysis, 175 (1998) 280) was the selective hydrogenation of butadiene, hexadiene and nitrobenzene in operations that couple the separation of hydrogen and the catalysis of hydrogenation in the same reactor, called a membrane catalytic reactor or a membrane reactor. The membrane that is present in this reactor is a catalytically active alumina-type mesoporous membrane on or in which have been deposited, in particular by impregnation, metal particles that have a catalytic role. However, these membranes, mesoporous, are not very selective and at the same time hydrogen like the hydrocarbons pass through the membrane. In these academic works, the particularly restricting limits of use of the hydrogenation process because of an uncontrolled diffusion and mixture of the hydrocarbons make difficult the monitoring of the selectivity of the reaction. Furthermore, this type of membrane, catalytically active, exhibits major drawbacks during the preparation, particularly in terms of implementation of the synthesis and the dispersion of metal with catalytic properties on the surface of the membrane as well as during the use.

Also, this invention proposes providing a selective hydrogenation process of polyunsaturated molecules that remedies the problems encountered in the previous processes. One of the objects of the invention is the development of a process for selective hydrogenation of polyunsaturated molecules that makes it possible to obtain a maximum selectivity for the reaction products corresponding to an intermediate hydrogenation stage while maintaining an optimal conversion of the polyunsaturated molecules.

The object of this invention is a selective hydrogenation process of polyunsaturated compounds that are contained in a hydrocarbon feedstock by means of a catalytic reactor with a hydrogen-selective membrane, comprising:

a) the introduction of said feedstock co-mixed with hydrogen in at least one reaction zone of said reactor, b) the contact of at least a portion of hydrogen that is necessary to the hydrogenation reaction with the face that is upstream from said membrane, which is inorganic and porous, and c) the catalytic reaction in said reaction zone of the feedstock introduced there in stage a) with at least a portion of the hydrogen that selectively passes through said membrane.

Said membrane catalytic reactor combines at least one catalyst in divided form, for example in the form of balls, grains or extrudates, with at least one inorganic membrane, porous, catalytically inactive and hydrogen-selective. The membrane is inactive on the catalytic plane and is lacking in any type of catalytic element within its porous network. Said membrane allows hydrogen to pass selectively, preferably by a selective diffusion mechanism, from its upstream face to its downstream face. The hydrogen that has selectively passed through the membrane and that is thus found in the downstream space of the membrane reacts in the reaction zone of the reactor with the hydrocarbon feedstock that contains polyunsaturated compounds, whereby said feedstock was previously co-mixed with hydrogen.

The reactor preferably comes in tubular form, but any geometry is compatible with the formed combination of catalyst and membrane. When the reactor comes in tubular form, the membrane can be either surrounded by catalyst or can be found around the catalyst. Another preferred form of the reactor is the one where the reactor comes in flat form. The membrane then generally forms a first flat layer, and the catalytic bed forms a juxtaposed second flat layer. The combination of the membrane and the catalyst can coat several forms according to the geometries of the membrane: the catalyst in divided form can be placed in the inside space, or outside space that is delimited by the tubular membrane; it can also be dispersed into a bundle of hollow-fiber-type membranes. Regardless of the geometry of the membrane, the catalyst is preferably placed in the space downstream from the membrane.

According to the invention, at least a portion of the hydrogen that is necessary to the selective hydrogenation reaction is brought into direct contact with the face that is upstream from said membrane and then selectively passes through the membrane, preferably by a diffusion mechanism, into the catalytic bed (space downstream from the membrane) by the porous network of said membrane. Preferably, at least 30% of the hydrogen that is necessary to the selective hydrogenation reaction is brought into direct contact with the face that is upstream from said membrane. Preferably, at least 50%, more preferably at least 70%, and even more preferably at least 75, but at most 99% of the hydrogen that is necessary to the selective hydrogenation reaction is brought into direct contact with the upstream face of said membrane. Advantageously, the hydrocarbon feedstock that contains the unsaturated compounds to be hydrogenated in a selective way and introduced into the reaction zone of the catalytic reactor according to stage a) of the process according to the invention contains at least 1% and at most 70% of the hydrogen that is necessary to the selective hydrogenation reaction, preferably it contains at most 50% thereof and even more preferably it contains at most 25% thereof. Said hydrocarbon feedstock that is co-mixed with hydrogen is introduced into the reaction zone of the catalytic reactor with a hydrogen-selective membrane, i.e., with direct contact of the catalyst that is included in said reactor and present in the space that is downstream from the membrane.

Preferably, for the hydrogenation of a double bond, the ratio of $H_2$/polyunsaturated compounds to be hydrogenated selectively in said feedstock is non-zero and is less than 0.7, preferably it is less than 0.5, more preferably it is less than 0.3, and even more preferably it is less than 0.25. A small ratio of H2/polyunsaturated compounds to be hydrogenated selectively is adequate for obtaining a high selectivity of intermediate hydrogenation product while preserving an optimal conversion into polyunsaturated compounds. Thus, for example, when the polyunsaturated compounds to be hydrogenated selectively are diolefins, said ratio is less than 0.7, preferably it is less than 0.5, more preferably it is less than 0.3, and even more preferably, it is less than 0.25. When the polyunsaturated compounds are acetylenic and the process according to the invention is aimed at producing diolefins, said ratio is less than 0.7, preferably less than 0.5, more preferably less than 0.3, and even more preferably less than 0.25. When it is a matter of selectively hydrogenating two double bonds, for example, the selective hydrogenation of a triene into monoolefin, said ratio is non-zero and is less than 1.4, preferably less than 1, more preferably less than 0.6, and even more preferably less than 0.5.

In accordance with the process according to the invention, the membrane included within the membrane catalytic reactor plays the role of a selective hydrogen distributor at the catalytic bed. The selective transfer, preferably carried out by a selective diffusion mechanism, of the hydrogen from the upstream face to the downstream face via the porous membrane makes it possible to monitor the supply of hydrogen within the catalytic bed, which limits the exothermy of the reaction, the loss of control and the successive reactions. This supply of hydrogen that is controlled in terms of concentration and is regular over time in a stationary operation within the catalytic bed thus makes it possible to prevent local overconcentrations of hydrogen within the catalytic bed, which is reflected by high hydrocarbon conversions and very high selectivities for the selective hydrogenation products. The monitoring of the selectivity of the reaction products is thus carried out by controlled distribution of hydrogen through the membrane.

The hydrogen, which is usually used on the industrial scale as a reagent for the hydrogenation reactions, allows a high purity (greater than 90 mol % and more generally greater than 95%). In the process according to the invention, it is advantageous from an economical and technical viewpoint to use an outside hydrogen source with a lower purity and a lower cost for the contact of the hydrogen with the face that is upstream from the membrane. The membrane that is included in the membrane catalytic reactor being hydrogen-selective allows only hydrogen to pass while the possible impurities that are also present in the outside source do not pass through the membrane. Consequently, the purity of the hydrogen that is present in the outside source is less critical than in the processes of the prior art.

Thus, the portion of hydrogen that is necessary to the selective hydrogenation reaction and direct contact of the face that is upstream from said porous inorganic membrane can be obtained from an outside source that contains hydrogen of high purity, i.e., higher than 75 mol %, preferably higher than 90 mol %, and very preferably higher than 95 mol %. Said hydrogen portion that is necessary to the selective hydrogenation reaction and direct contact of the face that is upstream from said porous inorganic membrane can also be obtained from an outside source that is advantageously a gaseous effluent that contains impure hydrogen of the least purity, i.e., generally higher than 25 mol %, preferably higher than 50 mol % and very preferably higher than 65 mol %. The membrane thus makes possible the separation of hydrogen from the gaseous mixture then the selective distribution by partial or total transfer of this hydrogen, purified by passage through the membrane, to the catalytic bed. This implementation that consists in using an outside source that contains impure hydrogen thus makes it possible to recover the hydrogen that is obtained from a unit of refining or petrochemistry, purging gas, such as, for example, the one that is obtained from a unit for catalytic reforming, catalytic cracking, partial oxidation of hydrocarbons or reforming of methane and natural gas, or more generally of any unit that, in the refinery or the petrochemical complex, produces excess hydrogen or a recycling gas that contains hydrogen, or else that is obtained from liquid mixtures or vapors that contain hydrogen. For example, the membrane makes it possible to extract the hydrogen selectively from an effluent that contains hydrocarbons and impurities such as CO, COS and $H_2S$. These molecules, CO and $H_2S$ in particular, would run the risk, without the hydrogen-selective membrane that is inorganic and porous, of altering the activity of the catalyst that is used for hydrogenation. The integrated operation of separation by membrane makes it possible to avoid the presence of such compounds in the catalytic bed, and the outside hydrogen source can thus contain hydrocarbons and impurities. According to the process according to the invention, these impurities, not passing through the hydrogen-selective membrane, consequently do not have the harmful effect of deactivation in the reaction zone where circulate the hydrocarbon feedstock that is to be converted and the hydrogen that has selectively passed through the membrane, preferably by selective diffusion.

Any hydrogen-selective, porous, inorganic membrane that is known in the prior art is suitable for the implementation of the process according to the invention. Among these membranes, it is possible to cite, without being exhaustive, the zeolite membranes, the alumino-silicate membranes, the silica membranes, the alumina membranes, the carbon membranes and the composite membranes. The composite membranes are obtained with different inorganic phases, such as, for example, the zeolite membranes that are supported on alumina, on glass, on silica, on carbon or on metal. The zeolite membranes that are modified in particular with transition elements, such as titanium, boron, germanium or gallium, are also advantageously used for the implementation of the process according to the invention. Among the zeolite membranes, those whose zeolite is of structural type MFI, LTA, SOD, CHA, ANA, ERI, TON, AEL, EUO, MEL, MTT and FAU are preferred. When the membrane is supported, any type of inorganic substrate can be used, such as, for example, silica, alumina, glass, carbon, zirconia, titanium oxide, clay and porous metals, or a combination of these materials. The substrates and the membranes can have a tubular, flat, or spiral geometry or else be in the form of hollow fibers or multi-channel monoliths. Other geometries can also be suitable. The substrate geometries and the membranes that are compatible with an industrial use of these membranes are advantageously used. In particular, the substrates and the spiral or tubular membranes or the membranes that are in the form of hollow fibers, make it possible to operate modules and compact units (high ratio of membrane surface area to the equipment volume). Preferably, the porous, inorganic membrane that is present in the membrane catalytic reactor is a microporous-type or nanoporous-type membrane. Microporous membrane is defined as any membrane whose pore size is strictly less than 2 nm (nanometers). Nanoporous membrane is defined as any membrane whose pore size is on the order of a nanometer, i.e., preferably included between 2 and 10 nm. The mesoporous membranes can also advantageously be used, in particular when the pore sizes are less than 50 nm and preferably between 10 and 20 nm. The porosity of said $H_2$-selective inorganic membrane can be either uniform or gradual. The porosity of the membrane is called uniform when the pore size is homogenous in the entire porous network of the membrane. The pore size distribution is then narrow. The porosity of the membrane is called gradual (porosity gradient) when the pore size is not homogeneous in the entire porous network of the membrane. The difference in pore size in the porous network (porosity gradient) is advantageous for monitoring in an optimal way the distribution of hydrogen within the catalytic bed. The porosity gradient can vary, for example, in an axial, radial or longitudinal manner according to the geometry of the membrane. In the case where the porosity of the membrane is gradual, it is preferred that the size of the pores of the membrane be larger on the membrane fraction that is located close to the inlet of the catalytic reactor where the hydrocarbon feedstock that contains the polyunsaturated compounds that are to be hydrogenated is introduced than on the membrane fraction that is removed from the inlet of the reactor. For example, on the membrane fraction that is combined with the first third of the volume of the membrane catalytic reactor, the pore size is between 10 and 20 nm, preferably between 10 and 15 nm; on the membrane fraction that is combined with the second third of the membrane catalytic reactor volume, the pore size is between 2 and 5 nm, preferably between 2 and 3 nm; and on the membrane fraction that is combined with the third of the membrane catalytic reactor volume, the pore size is less than 1 nm, preferably less than 0.8 nm. For example, an inorganic membrane of controlled porosity of Membralox® type, marketed by Vivendi (tubular membrane with a longitudinal porosity gradient), can advantageously be used in the membrane catalytic reactor for the implementation of the process according to the invention. Another example relates to a zeolite-type membrane that is supported on mesoporous alumina: the substrate can consist over its entire length of 10 nm porous alumina, covered by alumina of the gamma-allotropic variety with a pore size of 5 nm on the membrane fraction that is combined with the second third of the membrane catalytic reactor volume and covered by MFI zeolite with a pore size of 0.55 nm that is obtained by hydrothermal synthesis on the membrane fraction that is combined with the third third of the volume of the membrane catalytic reactor.

Said inorganic membrane, hydrogen-selective and with a uniform or gradual porosity, exhibits satisfactory properties in terms of chemical and thermal stability. Thus, the membrane is stable in the presence of a hydrocarbon feedstock that contains polyunsaturated compounds such as polyolefins or aromatic compounds.

Furthermore, the thermal stability of said inorganic membrane makes it possible to regenerate the catalyst that is combined with the membrane in the catalytic reactor with a membrane that is thus formed, whereby said regeneration takes place generally at temperatures that are close to and even higher than 200° C.

Any selective hydrogenation catalyst that is known to one skilled in the art can be used in the membrane catalytic reactor for the hydrogenation reaction. Thus, any supported catalyst comprising at least one metal of group VIII and more particularly a noble metal of group VIII can be used in the catalytic bed of the reactor. The multimetallic catalytic formulas that contain both at least one metal of group VIII and at least one additional metal, for example selected from among tin, germanium, silver and gold, are also advantageously used. When the process according to the invention is used for the selective hydrogenation of aromatic compounds, the preferred metals of group VIIII are platinum and nickel. In the case of selective hydrogenation of dienes or acetylenic compounds, the preferred metal of group VIII is palladium. The substrate on which the metal(s) is (are) deposited preferably has an inorganic nature. The substrate of the catalyst for the implementation of the process according to the invention generally comprises a refractory oxide that is selected from among the oxides of metals of groups II, III and IV of the periodic table, such as, for example, the oxides of magnesium, aluminum, silicon, titanium, zirconium and thorium, by itself or mixed with one another or mixed with other oxides of metals from the periodic table. As a catalytic substrate, it is also possible to use carbon, zeolites, for example of the structural type of FAU (zeolite X or Y), MOR (mordenite zeolite), MFI (ZSM-5 zeolite), MAZ (ZSM-4 or Omega) as well as mixtures of oxides of metals of groups II, III and/or IV with a zeolitic material. The catalyst comes in divided form, preferably in the form of balls or extrudates. Said catalyst is in direct contact with the hydrocarbon feedstock that contains polyunsaturated compounds and that is co-mixed with hydrogen as well as with the hydrogen that has selectively passed through the membrane and is necessary to the hydrogenation reaction.

The catalyst may be activated either in situ, i.e., in the reaction zone of the membrane catalytic reactor, or ex situ, prior to the loading of the catalyst. The activation stage consists of a stage for reducing metallic oxides of the catalyst, for example in pure hydrogen or in dilute hydrogen. The catalyst can be regenerated either in situ, i.e., directly in the membrane catalytic reactor, or ex situ, which then makes it necessary to withdraw the catalyst from the reactor and to reintroduce it after regeneration. The regeneration can be done according to any method that is known to one skilled in the art.

According to a first mode of configuration of the catalytic reactor with a hydrogen-selective membrane, the distribution of the catalyst that is present in the reaction zone of said reactor is homogeneous. According to a second mode of configuration of the catalytic reactor with a hydrogen-selective membrane, the distribution of the catalyst that is present in the reaction zone of said reactor is gradual so as to monitor the conversion of unsaturated compounds based on local concentrations of hydrogen and these unsaturated compounds. The distribution gradient of the catalyst can vary, for example, axially, longitudinally or radially according to the geometry of the reactor and the related membrane. A preferred configuration will produce a larger amount of hydrogenation catalyst at the inlet of the reaction zone than at the outlet. For example, 30 to 70% by mass, and preferably 40 to 60% by mass of the catalyst, is found in the reaction zone that corresponds to the first third of the membrane catalytic reactor volume, 20 to 45% and preferably 25 to 35% by mass of the catalyst is found in the reaction zone that corresponds to the second third of the membrane catalytic reactor volume, and 5 to 30%, and preferably 10 to 20%, by mass of catalyst is found in the reaction zone that corresponds to the third third of the membrane catalytic reactor volume.

The polyunsaturated compounds that can be hydrogenated selectively according to the process of the invention are selected from the group that consists of dienes, polyolefins, acetylene compounds, polyacetylene compounds, aromatic compounds, polyaromatic compounds and the aromatic compounds that have unsaturated hydrocarbon chains, for example the aromatic alkenyls. These unsaturated compounds can be contained in a hydrocarbon feedstock that is obtained from a refining process or a petrochemistry process. The dienes can be, for example, conjugated, allenes, or non-conjugated. The hydrocarbon feedstock can contain impurities such as hydrogen sulfide, sulfur oxides, nitrogen oxides or carbon oxides.

The stability of the porous inorganic membrane makes it possible to operate the membrane reactor in a wide range of operating conditions (temperature, pressure, concentration of chemical molecules) and with feedstocks whose compositions can vary, in particular with olefins, polyolefins, acetylene compounds, aromatic compounds, polyaromatic compounds and impurities such as hydrogen sulfide, sulfur oxides and carbon oxides.

The operating conditions for the implementation of the process according to the invention are generally as follows:

Feed pressure of the hydrocarbon feedstock: from 0.1 to 6 MPa, preferably from 0.2 to 5 MPa, and more preferably from 0.7 to 4 MPa.

Hydrogen pressure (upstream from the membrane): from 0.1 to 3 MPa, more preferably from 0.2 to 2 MPa, and even more preferably from 0.2 to 1.5 MPa.

Temperature: from 5 to 300° C., preferably from 10 to 200° C., and more preferably from 15-150° C.

Hourly volumetric flow rate (VVH) of the feedstock that contains the compound(s) to be hydrogenated: from 0.05 to 50 $h^{-1}$, preferably from 1 to 20 $h^{-1}$, and more preferably from 2 to 10 $h^{-1}$ relative to the catalyst that is employed in the hydrogenation reaction.

These conditions are compatible with the integrated stages for separation of hydrogen, selective diffusion of hydrogen and catalytic hydrogenation coupled in the membrane catalytic reactor, and they promote the synergy of the separation/reaction coupling by optimizing the recovery and the distribution of hydrogen.

The following examples illustrate the invention and should in no case be considered as limiting relative to the scope of the invention.

EXAMPLE 1

Selective Hydrogenation of Butadiene-1,3

In this example, a catalytic reactor with a hydrogen-selective membrane is obtained by combination of (a) an MFI-zeolite-type porous inorganic membrane, supported on a porous alumina of tubular geometry, and (b) a catalyst for selective hydrogenation of butadiene-1,3. The membrane is prepared by hydrothermal crystallization of a solution that contains silicon (Aerosil 380, Degussa), tetrapropyl ammonium hydroxide TPAOH (Fluka) and water (solution with a stoichiometry of 1 $SiO_2$, 0.4 TPAOH, 22.3 $H_2O$), subjected for 72 hours to a treatment at 175° C. in the presence of an alumina substrate of an alpha allotropic variety (PaII) of tubular geometry. The membrane that is obtained is calcined in air at 450° C. so as to degrade the organic compound TPAOH. The characterization by x-ray diffraction and the gas permeation ($nC_4H_{10}/iC_4H_{10}$) confirms that the membrane is of MFI-zeolite-type (pore diameter of about 0.55 nm) supported on alumina. Catalyst grains (2.8 g, Axens) based on palladium supported on alumina are placed in the inside space (downstream) of the MFI zeolite membrane, in tubular form. The membrane catalytic reactor that is thus formed is used in a reaction for selective hydrogenation of butadiene-1,3.

To obtain maximum conversion, i.e., at least 90%, the feed (19.4 ml/mn, 1.05 bar, butadiene 10.4%, hydrogen 3.4%, argon 86.2%) is introduced into the inside space (downstream) of the membrane, upon contact with the catalyst that is kept at 30° C. The hydrogen to butadiene ratio in the feed is equal to 0.32. The volumetric flow rate by weight (in English: Weight Hourly Space Velocity) is 0.1 h$^{-1}$ (in gram of butadiene per hour and per gram of catalyst). In the outside space (upstream) of the membrane, hydrogen is introduced upon contact with the face that is upstream from the inorganic and porous selective membrane (28.9 mL/mn, 1.05 bar, 100% H$_2$). This hydrogen, which represents 68% of the hydrogen that is necessary to the selective hydrogenation reaction, selectively diffuses through the membrane that plays a distribution role and then reacts at the catalytic bed in the space downstream from the membrane.

The membrane catalytic reactor that is thus obtained is continuously evaluated over periods of greater than 500 hours (age of the catalyst).

Under these conditions, the conversion of butadiene, measured by gas phase chromatography, reaches 99.1%, and the selectivity of selective hydrogenation product, the butenes, reaches 98.6%.

Several catalyst regeneration phases are carried out in pure hydrogen, at 200° C. At the end of these regeneration phases of the catalyst, carried out in situ, the membrane catalytic reactor preserves its very good performance levels of selectivity and conversion. The porous inorganic membrane makes it possible to distribute the hydrogen that is necessary for the reaction to the catalyst. The diffusion through the membrane is done in a controlled manner and thus makes it possible to obtain very high butadiene conversions with very high reaction selectivities.

The experiment that is described above is implemented with a feed having a hydrogen content such that the H2/butadiene ratio in the feedstock is equal to 0.17. All of the results are presented in Table 1.

EXAMPLE 2

Comparative Example

The synthesis of the hydrogen-selective MFI membrane and the production of the membrane catalytic reactor are implemented as described in Example 1. In this Example 2, there is no distribution of hydrogen through the membrane: the hydrogen is co-supplied in the hydrocarbon feedstock, and the membrane does not play a role of hydrogen distributor. The feed is thus introduced into the inside space (downstream) of the membrane (20 ml/mn, 1.05 bar, butadiene and hydrogen diluted in argon), upon contact with the catalyst that is kept at 30° C. In this configuration, the system is of the fixed-bed type. The volumetric flow rate by weight is 0.1 h$^{-1}$. In the feed, the amount of hydrogen that is introduced is modulated so as to have variable hydrocarbon conversions. To obtain 60% butadiene conversion, the molar ratio of hydrogen to butadiene in the feedstock is equal to 0.51. To obtain 90% conversion, this ratio is equal to 0.74. To reach 90% conversion, this ratio is equal to 1.12.

The results that are obtained in terms of butadiene conversion and butene selectivity are provided in Table 1 below and are compared with those obtained in Example 1.

TABLE 1

Butadiene Conversion and Butene Selectivity

| | Example 1 (Invention) | Example 2 (For Comparison) | | |
|---|---|---|---|---|
| Conversion (%) | 82 | 99.1 | 60 | 80 | 90 |

TABLE 1-continued

Butadiene Conversion and Butene Selectivity

| Selectivity (%) | 100 | 98.6 | 100 | 92 | 79 |
|---|---|---|---|---|---|
| H2/Butadiene Ratio in the Feedstock | 0.17 | 0.32 | 0.51 | 0.74 | 1.12 |

Under analogous operating conditions, the catalytic reactor with a hydrogen-selective membrane, formed by the combination of a porous MFI inorganic membrane and a hydrogenation catalyst, makes it possible to obtain catalytic selectivities that are clearly higher than the standard reactor. In particular, for high conversions, the selectivities are degraded with a fixed bed. The monitored distribution of hydrogen by the membrane makes it possible to maintain high selectivities with high conversion, and the membrane catalytic reactor thus makes it possible to obtain catalytic performance levels that are clearly higher than the fixed bed that is operated under analogous operating conditions. A small H2/butadiene ratio is adequate for obtaining a high butene selectivity while preserving optimal conversion.

EXAMPLE 3

The membrane catalytic reactor is identical to the one that is used in Example 1. The feed of the hydrocarbon feedstock consists of 10% butadiene in argon (19.0 mL/mn, 1.05 bar) in the presence of a variable hydrogen flow rate that is adjusted so as to vary the hydrogen to butadiene ratio (called H2/butadiene in the feedstock) by premixing in the feedstock. The catalytic bed, dispersed inside (downstream) of the tubular membrane, is kept at 30° C. (VVH=0.1 h$^{-1}$). In the outside space (upstream) of the membrane, hydrogen is introduced upon contact with the face that is upstream from the membrane (28.9 mL/mn, 1.05 bar, 100% H$_2$) such that an addition of hydrogen is distributed via the porous inorganic membrane within the catalytic bed. The results are provided in Table 2. In the absence of hydrogen in the hydrocarbon feedstock (H$_2$/butadiene in the feedstock=0), the butadiene conversion reaches 60% by distribution of hydrogen through the membrane. The distribution of hydrogen through the membrane makes it possible to obtain 100% conversion with a hydrogen-poor feed (premixing of the feedstock, hydrogen to butadiene molar ratio of 0.3). In this case, 70% of the hydrogen that is necessary to the selective hydrogenation of butadiene is obtained from the transfer by diffusion through the porous inorganic membrane, and this controlled diffusion makes it possible, throughout the catalytic bed, to monitor the exothermy and the reaction selectivity. The butene selectivity is maximum: the membrane catalytic reactor makes it possible to monitor the hydrogenation reaction by means of a monitored distribution of hydrogen within the catalytic bed.

TABLE 2

Influence of the H2/Butadiene Ratio in the Feedstock on the Butadiene-1,3 Conversion Rate

| H2/Butadiene in the Feedstock | 0 | 0.15 | 0.2 | 0.3 |
|---|---|---|---|---|
| Conversion (%) | 60 | 80 | 83 | 100 |

EXAMPLE 4

A porous and hydrogen-selective MFI inorganic membrane, identical to the one that is described in Example 1, is used. Into its inside volume (space downstream from the membrane) is gradually placed catalyst that is identical to that which is described in Example 1. At the inlet of the reactor, the hydrocarbon concentration being the most significant, a first fraction of 0.93 g of pure catalyst, located in the first third of the volume of the membrane reactor, is introduced. Introduced into the second third of the membrane reactor volume is a second fraction of total mass of 0.93 g, composed of 0.47 g of catalyst that is mixed with 50% by mass with carborundum (Prolabo, particles with 2.38 mm of diameter). These solid particles of carborundum, inert from a catalytic and chemical viewpoint, play a role of diluting the catalyst, and they make it possible to obtain the same flow of the reagents within the catalytic bed. Into the third third of the volume of the membrane reactor, i.e., in the fraction of volume close to the outlet of the reactor and where the butadiene concentrations are low, a third fraction with a total mass of 0.93 g of catalyst mixed with 20% by mass is introduced with carborundum. Thus, the distribution by mass of catalyst is such that 58% by mass of catalyst is found in the first third of the volume of the reactor; 30% by mass of catalyst is found in the second third of the volume of the reactor; and 12% by mass of catalyst is found in the third third of the volume of the reactor.

The feed comprises 11.4% of butadiene in argon (16.6 mL/mn, 1.05 bar, 30° C.) as well as 1% of the hydrogen that is necessary to the hydrogenation reaction. In the outside space (upstream) of the membrane, hydrogen is introduced upon contact with the face that is upstream from the membrane (27 mL/mn, 1.05 bar, 100% $H_2$). Under these conditions, the conversion reaches 99%, and the butene selectivity is 98%. The selectivity toward the monohydrogenation products is monitored by selective hydrogen distribution by the porous inorganic membrane.

Thus, by using a membrane catalytic reactor that is formed by the combination of a hydrogen-selective porous inorganic membrane and a catalyst that is distributed in a gradual way in the inside volume of the membrane, excellent results are obtained: the selectivity is at a maximum at very high conversion rates.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 03/01.093, filed Jan. 31, 2003 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for selective hydrogenation of polyunsaturated compounds contained in a hydrocarbon feedstock by a catalytic reactor comprising an inorganic and porous hydrogen-selective membrane and at least one reaction zone comprising at least one bed of catalyst downstream of said membrane, said process, comprising:
   a) providing said hydrocarbon feedstock mixed with a first portion of hydrogen and introducing the resultant mixture into at least one reaction zone of said reactor, said first portion of hydrogen being insufficient for said selective hydrogenation reaction,
   b) providing at least a second portion of the hydrogen necessary to the selective hydrogenation reaction at the upstream face of said hydrogen-selective membrane, so as to selectively diffuse said second portion of hydrogen through said membrane in a controlled manner distributing directly into said reaction zone, and
   c) conducting a catalytic reaction in said reaction zone of the feedstock introduced in stage a) with at least a portion of the hydrogen that is selectively diffused though said membrane, so as to hydrogenate unsaturated bonds in the polyunsaturated compounds.

2. A process according to claim 1, wherein the second portion of hydrogen comprises at least 30% of the hydrogen necessary to the selective hydrogenation reaction and which is brought into direct contact with the upstream face of said membrane.

3. A process according to claim 2, in which at least 70% of the hydrogen necessary to the selective hydrogenation reaction is brought into direct contact with the upstream face of said membrane.

4. A process according to claim 1, in which said hydrogen portion that is brought into contact with the upstream face of the membrane is obtained from an outside source that contains hydrogen with a purity that is higher than 20 mol %.

5. A process according to claim 4, in which said outside source contains hydrocarbons and impurities.

6. A process according to claim 1, in which said hydrogen-selective membrane is selected from among zeolite membranes, alumino-silicate membranes, silica membranes, alumina membranes, carbon membranes and composite membranes.

7. A process according to claim 1, in which said hydrogen-selective membrane is a microporous membrane.

8. A process according to claim 1, in which said hycrogen-selective membrane is a nanoporous membrane.

9. A process according to claim 1, in which said hydrogen-selective membrane exhibits a uniform porosity.

10. A process according to claim 1, in which said hydrogen-selective membrane exhibits a gradual porosity.

11. A process according to claim 1, in which said reaction zone contains a supported catalyst that comprises at least one metal of group VIII.

12. A process according to claim 1, such that the distribution of the catalyst that is present in the reaction zone is homogeneous.

13. A process according to claim 1, such that the distribution of the catalyst that is present in the reaction zone is gradual.

14. A process according to claim 13, such that the amount of said catalyst is larger at the inlet of the reaction zone than at the outlet.

15. A process according to claim 1, such that said polyunsaturated compounds are selected from the group that consists of dienes, polyolefins, acetylene compounds, polyacetylene compounds, aromatic compounds, polyaromatic compounds and aromatic compounds that have unsaturated hydrocarbon chains.

16. A process according to claim 1, such that the feed pressure of the hydrocarbon feedstock is between 0.1 and 6 Mpa; the hydrogen pressure (upstream from the membrane) is between 0.1 and 3 Mpa; the temperature is between 5 and 300° C., and the hourly volumetric flow rate (VVH) of the feedstock that contains the compound(s) to be hydrogenated is between 0.05 and 50 $h^{-1}$.

17. A process according to claim 1, comprising hydrogenating butadiene to butene.

18. A process according to claim 17, wherein the $H_2$:butadiene molar ratio in the mixture of hydrocarbon feedstock and first portion of hydrogen is at least 0.17:1.

19. A process according to claim 18, wherein the $H_2$:butadiene molar ratio in the mixture of hydrocarbon feedstock and first portion of hydrogen is at least 0.32:1.

* * * * *